United States Patent
Hall et al.

(10) Patent No.: US 8,822,720 B2
(45) Date of Patent: Sep. 2, 2014

(54) METHOD FOR THE ORGANOCATALYTIC ACTIVATION OF CARBOXYLIC ACIDS FOR CHEMICAL, REACTIONS USING ORTHOSUBSTITUTED ARYLBORONIC ACIDS

(75) Inventors: Dennis Hall, Edmonton (CA); Olivier Marion, St. Redempteur (CA); Raed Al-Zoubi, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 971 days.

(21) Appl. No.: 12/669,983

(22) PCT Filed: Sep. 5, 2008

(86) PCT No.: PCT/CA2008/001554
§ 371 (c)(1),
(2), (4) Date: Jan. 21, 2010

(87) PCT Pub. No.: WO2009/030022
PCT Pub. Date: Mar. 12, 2009

(65) Prior Publication Data
US 2010/0197960 A1    Aug. 5, 2010

Related U.S. Application Data

(60) Provisional application No. 60/970,083, filed on Sep. 5, 2007.

(51) Int. Cl.
*C07F 5/02*        (2006.01)

(52) U.S. Cl.
USPC ............................................................ 562/7

(58) Field of Classification Search
USPC ............................................................ 562/7
See application file for complete search history.

(56) References Cited

U.S. PATENT DOCUMENTS

7,825,104 B2 * 11/2010 Freeman et al. .................. 514/64
2004/0220146 A1   11/2004 Freeman et al.

FOREIGN PATENT DOCUMENTS

| JP | 2004-536135 | 12/2004 |
| WO | WO2007/034282 | 3/2007 |

OTHER PUBLICATIONS

Kuivila et al., "Electrophilic Displacement Reactions. XIV. Two Novel Reactions Involving Areneboronic Acids and Halogens", .J. Org. C'hem, 1942, 27, 825-829.*
Lulinski et al., "An Ortho-Lithiated Derivative of Protected Phenylboronic Acid: an Approach to Ortho-Functionalized Arylboronic Acids and 1,3-Dihydro-1-Hydroxyben-zo[c][2,1]oxaboroles" Appl. Organometal. Chem. 2007, 21,234-238.*
Carlson, R. et al., "Lewis Acids in Organic Synthesis, Approach to a Selection Straategy for Screening Experiments," Acta Chem. Scand., Ser. B 1986, 40, 522.
Charville, H. et al., "The Thermal and boron-catalysed direct amide formation reactions: mechanistically understudied yet important processes," Chem. Commun., Feb. 2010, 46, 1813-1823.
Collum, David B. et al., "S-Oxides of Tetrathiafulvalenes," J. Org. Chem. 1978, 43, 4393.
Giles, R. L., "Synthesis and Application of Bifunctional Lewis Acid; Lewis Base Molecules as Efficient Catalysts for Amide Bond Formation," Abstract of papers, 229th ACS Nat'l. Meeting, San Diego, CA, Mar. 13-17, 2005.
Ishihara, K. et al., "3,5-Bix(perfluorodecyl)phenylboronic Acid as an Easily Recyclable Direct Amide Condensation Catalyst," Synlett; 2001(9): 1371-1374.
Ishihara, K. et al., "(3,4,5-Trifluorophenyl) Boronic Acid-Catalyzed Amide Formation from Carboxylic Acids and Amines: N-Benzyl-4-Phenylbutyramide," Org. Synth. Coll. vol. 10 2004:80.
Maki T. et al., "N-Alkyl-4-boronopyridinium Halides versus Boric Acid as Catalysts for the Esterification of α-Hydroxycarboxylic Acids," Org. Lets. Oct. 2005, 7(22): 5047-5050.
Pelter, A. et al., "Some Amide Forming Reactions Involving Boron Reagents," Tetrahedron, vol. 26, 5, 1970, pp. 1539-1544.
Pelter, A. et al., "Investigations of the Mechanisms of Interaction of Acyloxyalkoxyboranes with Amines," Tetrahedron 1970, 26, 1545.
Srinivas, P. et al., "Mixed Anhydrides of Boric and Carboxylic Acids as Selective Acylation Reagents," Poster session 237, 223rd ACS Nat'l. Meeting, Div. of Org. Chem., Orlando, FL, USA, Apr. 7-11, 2002.
Tani, J. et al., "Convenient method of amidation of carboxylic acids using oron triflouride etherate," Synthesis 1975, 11, 714-715.

(Continued)

Primary Examiner — Fereydoun G Sajjadi
Assistant Examiner — Kofi Adzamli
(74) Attorney, Agent, or Firm — Lathrop & Gage LLP

(57) ABSTRACT

The present disclosure describes operationally simple methods for the low temperature, catalytic activation of carboxylic acids for organic reactions, in particular for direct amidation reactions with amines. The methods involve the use of ortho-substituted arylboromc acids of the formula (I), wherein the groups $R^1$ to $R^5$ are as defined herein. In preferred embodiments $R^1$ is halogen. The arylboromc acids catalyze nucleophilic 1,2-addition reactions, conjugate 1,4-addition reactions, and cycloaddition reactions, including Diels-Alder reactions involving α,β-unsaturated carboxylic acids.

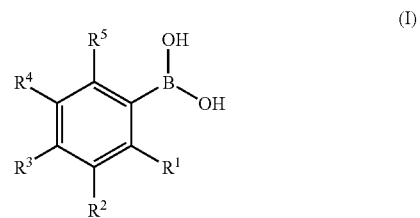

(I)

20 Claims, No Drawings

(56) References Cited

OTHER PUBLICATIONS

Trapani, G. et al., Trimethylamine-Borane as Useful Reagent in the N-Acylation or N-Alkylation of Amines by Carboxylic Acids, Synthesis 1983, 1013-1014.
Maki et al., "New boron(III)-catalyzed amide and ester condensation reactions", Tetrahedron, 2007, pp. 8645-8657, vol. 63, Elsevier Ltd.
Al-Zoubi et al., "Direct and Waste-Free Amidations and Cycloadditions by Organocatalytic Activation of Carboxylic Acids at Room Temperature", Angew. Chem. Int. Ed., 2008, pp. 2876-2879, vol. 47, and Supporting Information Mar. 5, 2008, pp. S1-S33, Wiley InterScience.
Kuivila et al., "Electrophilic Displacement Reactions. XIV. Two Novel Reactions Involving Areneboronic Acids and Halogens", J. Org. Chem., 1962, pp. 825-829, vol. 27.
Dabrowski et al., "An Ortho-Lithiated Derivative of Protected Phenylboronic Acid: an Approach to Ortho-Functionalized Arylboronic Acids and 1,3-Dihydro-1-Hydroxybenzo[c][2,1]oxaboroles", Appl. Organometal. Chem., 2007, pp. 234-238, vol. 21, John Wiley & Sons, Ltd.
Ishihara et al., "3, 4, 5-Trifluorobenzeneboronic Acid as an Extremely Active Amidation Catalyst", J. Org. Chem., 1996, pp. 4196-4197, vol. 61, American Chemical Society.
Ishihara et al., "Arylboron Catalysts for Stereoselective Organic Transformations", ACS Symposium Series, 2001, pp. 108-121, vol. 783, American Chemical Society.
International Search Report for PCT/CA2008/001554, Jan. 21, 2010.
International Preliminary Examination Report for PCT/CA2008/001554, Feb. 10, 2011.
Latta et al., "Development and Synthesis of an Arylboronic Acid-based Solid Phase Amidation Catalyst", Synthesis 2001, 11, 1611-1613.
Al-Zoubi et al., "Mild Silver(I)-Mediated Regioselective Iodination and Bromination of Arylboronic Acids" Organic Letters, 2010, vol. 12, No. 11, pp. 2480-2483, American Chemical Society.
Durka et al., "Electrophillic ipso-iodination of silylated arylboronic acids" Journal of Organometallic Chemistry, 2010, vol. 695, pp. 2635-2643.
Chaudhari et al., "Sulfated tungstate: a new solid heterogeneous catalyst for amide synthesis" Green Chemistry, 2010, vol. 12, pp. 1707-1710.

Arnold, et al., "Synthesis, evaluation and application of novel bifunctional N, N-diisopropylbenzylamineboronic acid catalysts for direct amide formation between carboxylic acids and amines", Green Chemistry, 2008, vol. 10, pp. 124-134.
Comerford, et al., "Clean, reusable and low cost heterogeneous catalyst for amide synthesis", Chem. Commun., 2009, pp. 2562-2564.
Marcelli, T., "Mechanistic Insights into Direct Amide Bond Formation Catalyzed by Boronic Acids: Halogens as Lewis Bases", Angew. Chem, Int. Ed. 2010, vol. 49, pp. 6840-6843.
Arnold et al., "To Catalyze or not to Catalyze? Insight into Direct Amide Bond Formation from Amines and Carboxylic Acids under Thermal and Catalyzed Conditions" Adv. Synth. Catal. 2006, vol. 348, pp. 813-820.
English translation of Second Notification of Office Action for Chinese Patent Application No. 200880114340.X, issued Feb. 16, 2013.
English translation of Chinese Office Action for Chinese Patent Application No. 2008-80114340.X issued Aug. 22, 2013.
English translation of Notice of Reasons for Rejection for Japanese Patent Application No. 2010-523243 issued Jul. 24, 2013.
Kuivila, H. G., et al., "Electrophilic Displacement Reactions. XIV. Two Novel Reactions Involving Areneboronic Acids and Halogens", The Journal of Organic Chemistry, 1962, vol. 27, No. 3, pp. 825-829.
Dabrowski, M., et al., "An ortho-lithiated derivative of protected phenylboronic acid: an approach to ortho-functionalized arylboronic acids and 1, 3-dihydro-1-hydroxybenzo[c] [2, 1]oxaboroles", Applied Organometallic Chemistry, Mar. 6, 2007, vol. 21, No. 4, pp. 234-238.
Ishihara, K., et al., "3,4,5-Trifluorobenzeneboronic Acid as an Extremely Active Amidation Catalyst", The Journal of Organic Chemistry, 1996, vol. 61, No. 13, pp. 4196-4197.
English translation of Office Action for Chinese Patent Application No. 200880114340.X, issued Jun. 1, 2012.
Arnold, K, et al., "To Catalyze or not to Catalyze? Insight into Direct Amide Bond Formation from Amines and Carboxylic Acids under Thermal and Catalyzed Conditions," *Adv. Synth. Catal.* 2006, 348, 813-820.
Al-Zoubi, R. M., et al., "Direct and Waste-Free Amidations and cycloadditions by Organocatalytic Activation of Carboxylic Acids at Room Temperature**," *Angewandte Chemie International Edition*, vol. 47, Mar. 5, 2008, pp. 2876-2879 and Supporting Information.
Japanese Notice of Reasons for Rejection dispatched Feb. 19, 2014, for Japanese Patent Application No. 2010-523243, including English translation.

\* cited by examiner

METHOD FOR THE ORGANOCATALYTIC ACTIVATION OF CARBOXYLIC ACIDS FOR CHEMICAL, REACTIONS USING ORTHOSUBSTITUTED ARYLBORONIC ACIDS

This application is a National Stage of co-pending International Application No. PCT/CA2008/001554, filed Sep. 5, 2008, which claims the benefit of Provisional Application No. 60/970,083, filed Sep. 5, 2007, the contents of both of which are herein incorporated by reference.

FIELD OF THE DISCLOSURE

The present disclosure includes operationally simple methods for the low temperature, catalytic activation of carboxylic acids for organic reactions, in particular for direct amidation reactions with amines, cycloadditions and conjugate additions.

BACKGROUND OF THE DISCLOSURE

Amide bonds are ubiquitous in Nature and represent one of the most important functional groups that constitute biomolecules. Amides are the key units to the backbone of peptides and proteins, and are an important component of nucleotides. Consequently, the development of synthetic methods for amidation and peptide synthesis has long preoccupied chemists. Despite the favorable thermodynamic stability of the resulting amide bond, the simple dehydrative reaction between a free carboxylic acid and an amine is process plagued by a large activation energy. The initial formation of a stable ammonium carboxylate salt deters the dehydration step. The salt intermediate collapses to provide the amide product only at very high temperatures (typically over 160° C.) that are incompatible with functionalized molecules. Consequently, this important classical reaction continues to challenge chemists and there are still no means to make amides directly between free carboxylic acids and amines in a simple, green and atom-economical fashion.

Most current amide bond-forming methods involve the use of super-stoichiometric amounts (i.e., large excesses) of expensive and toxic reagents such as carbodiimides, carbonyldiimidazole, phosphonium salts, and others, to activate and dehydrate the carboxylic acid. These coupling agents and their associated co-reagents (bases, supernucleophiles, other additives) generate large amounts of wasteful by-products that tend to complicate the isolation of the desired amide.

The direct formation of amide bonds has been known since 1858 (Benz, G. In *Comprehensive Organic Synthesis, Vol 6*; Trost B. M., Fleming I., Heathcock C. H. Pergamon press: New York, 1991, Chap. 2.3). Catalysts that have been used for amidation reactions between carboxylic acids and amines include $TiCl_4$ (Carlson et al. Acta Chem. Scand. Ser. B. 1988, 28), $Ti(O-i-Pr)_4$, (Helquist et al. Tetrahedron Lett. 1988, 59, 3049), $Ph_3SbO/P_4S_{10}$ (Matsuda et al. J. Org. Chem. 1991, 56, 4076), $Sb(OEt)_4$ (Yamamoto et al. J. Am. Chem. Soc. 1996, 118, 1569) and $ArB(OH)_2$ (Ishihara et al. J. Org. Chem. 1996, 61, 4196), however, an efficient catalytic procedure that functions mildly under ambient conditions (i.e., room temperature) has not yet been developed.

The $ArB(OH)_2$ catalysts reported in Ishihara et al. (id) included those where Ar is 3,4,5-trifluorophenyl, 3-nitrophenyl, 3,5-di-(trifluoromethyl)phenyl, 4-trifluoromethylphenyl, phenyl, 2,4,6-tri-(trifluoromethyl)phenyl and 2,3,4,5-tetrafluorophenyl. The reactions were performed at temperatures of about 110° C. (refluxing toluene) with a catalyst loading of 5 mol % and with the removal of water using 4 Å molecular sieves in a Soxhlet thimble. A solid phase version of these catalysts was reported by Latta et al. (Synthesis. 2001, 11, 1611-1613) but it also requires very high temperatures.

SUMMARY OF THE DISCLOSURE

Herein, room temperature catalytic electrophilic activation of carboxylic acids has been achieved using ortho-substituted arylboronic acids. In particular room temperature amidation reactions on a variety of carboxylic acids as well as Diels-Alder reactions using an α,β-unsaturated carboxylic acid as the dienophile, have been achieved utilizing an ortho-substituted aryl boronic acid catalyst. The present catalytic activation method can also be applied to the electrophilic activation of the double or triple bond of α,β-unsaturated carboxylic acids, with applications in 1,4-conjugate additions reactions and other cycloadditions of alkenes and alkynes. This present method for the activation of carboxylic acids for subsequent reactions occurs under mild reaction conditions and is essentially waste free, producing water as the only by-product.

Accordingly, the present disclosure includes a method for the catalytic electrophilic activation of carboxylic acids for subsequent reactions comprising combining the carboxylic acid and an aryl boronic acid of the formula I:

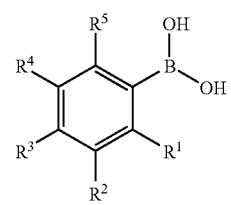

wherein $R^1$ is selected from halo, $C_{1-4}$alkyl, $C_{6-10}$aryl, $NO_2$, CN, $CO_2H$, $C(O)C_{1-4}$alkyl, $CO_2C_{1-4}$alkyl, $OC_{6-10}$aryl, $S(O)C_{1-4}$alkyl, $SO_2C_{1-4}$alkyl, $OCF_3$, $CR^6R^7OR^8$, $CR^6R^7SR^8$, OH, SH and $Si(R^8)_3$;

$R^2$ to $R^5$ are independently selected from H, halo, $C_{1-4}$alkyl, $C_{6-10}$aryl, $CO_2H$, $C(O)C_{1-4}$alkyl, $CO_2C_{1-4}$alkyl, $OC_{6-10}$aryl, $S(O)C_{1-4}$alkyl, $SO_2C_{1-4}$alkyl, fluoro-substituted-$C_{1-4}$alkyl, fluoro-substituted-$C_{1-4}$alkoxy, OH, SH, $SR^8$ and $Si(R^8)_3$;

$R^6$, $R^7$ and $R^8$ are independently selected from H, $C_{1-4}$alkyl and $C_{6-10}$aryl, with the proviso that the compound of formula I is not 2,3,4,5-tetrafluorophenyl boronic acid, under conditions for the electrophilic activation of the carboxylic acid.

In an embodiment of the disclosure, the carboxylic acid is activated for subsequent reaction with a nucleophile, such as an amine or alcohol, and the carboxylic acid and aryl boronic acid of the formula I are combined in the presence of a means for removal of water. According to this embodiment, the present disclosure, for example, provides a method for the preparation of amides or esters.

In another embodiment of the disclosure, the carboxylic acid is an α,β-unsaturated carboxylic acid that is activated for reaction with a diene in a Diels-Alder reaction or with a nucleophile in a 1,4-conjugate addition reaction.

The present disclosure also includes novel boronic acids of the formula

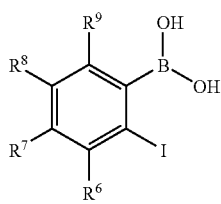

wherein:

$R^6$ is selected from H and $C_{1-4}$alkyl; and
$R^7$, $R^8$ and $R^9$ are independently selected from H, $C_{1-4}$alkyl and $OC_{1-4}$alkyl and one or two of $R^7$, $R^8$ and $R^9$ is H, or a salt thereof.

The compounds of formula II are new and represent a class of boronic acid catalysts that have good activity for the activation of carboxylic acids.

The present disclosure also includes compounds of formulae I and II that are attached, for example via a chemical bond, to a solid support for use in heterogeneous reaction conditions.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

DETAILED DESCRIPTION OF THE DISCLOSURE

It has been shown that certain ortho-substituted aryl boronic acids electrophilically activate carboxylic acids for organic reactions, including, for example, amidations, Diels-Alder cycloadditions and 1,4-conjugate additions. In particular these aryl boronic acids catalyze the reaction of amines (including primary and secondary amines) with carboxylic acids to provide amides in the presence of a means for removal of the water generated in this reaction. Also, these boronic acids catalyze the reaction of α,β-unsaturated carboxylic acids with dienes in the presence of water. These reactions occur at room temperature and result in very little waste or by-products.

Accordingly, the present disclosure includes a method for the catalytic electrophilic activation of carboxylic acids for subsequent reactions comprising combining the carboxylic acid and an aryl boronic acid of the formula I:

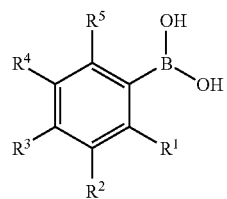

wherein $R^1$ is selected from halo, $C_{1-4}$alkyl, $C_{6-10}$aryl, $NO_2$, CN, $CO_2H$, $C(O)C_{1-4}$alkyl, $CO_2C_{1-4}$alkyl, $OC_{6-10}$aryl, $S(O)C_{1-4}$alkyl, $SO_2C_{1-4}$alkyl, $OCF_3$, $CR^6R^7OR^8$, $CR^6R^7SR^8$, OH, SH and $Si(R^8)_3$;

$R^2$ to $R^5$ are independently selected from H, halo, $C_{1-4}$alkyl, $C_{6-10}$aryl, $CO_2H$, $C(O)C_{1-4}$alkyl, $CO_2C_{1-4}$alkyl, $OC_{1-4}$alkyl, $SC_{1-4}$alkyl, $OC_{6-10}$aryl, $S(O)C_{1-4}$alkyl, $SO_2C_{1-4}$alkyl, fluoro-substituted-$C_{1-4}$alkyl, fluoro-substituted-$C_{1-4}$alkoxy, OH, SH, $SR^8$ and $Si(R^8)_3$;

$R^6$, $R^7$ and $R^8$ are independently selected from H, $C_{1-4}$alkyl and $C_{6-10}$aryl, with the proviso that the compound of formula I is not 2,3,4,5-tetrafluorophenyl boronic acid,
under conditions for the electrophilic activation of the carboxylic acid.

The term "alkyl" as used herein means a straight and/or branched chain, saturated alkyl group containing from one to four carbon atoms and includes methyl, ethyl, propyl, isopropyl, n-butyl, s-butyl, isobutyl and t-butyl.

The term "aryl" as used herein with respect to the compounds of formula I means a mono- or polycyclic ring containing from 6 to 10 carbon atoms and at least one aromatic ring and includes phenyl, naphthyl, 1,2-dihydronaphthyl, 1,2,3,4-tetrahydronaphthyl, fluorenyl, indanyl, indenyl and the like. In an embodiment aryl is phenyl.

The term "polycyclic" as used herein with respect to the compounds of formula I means a group that contains more than one ring linked together and includes, for example, groups that contain two (bicyclic), three (tricyclic) or four (quadracyclic) rings. The rings may be linked through a single bond, a single atom (spirocyclic) or through two atoms (fused and bridged).

The term "fluoro-substituted" as used herein with respect to the compounds of formula I refers to an alkyl or alkoxy group in which one or more, including all, of the hydrogen atoms have been replaced with a fluorine atom.

The term "halo" as used herein with respect to the compounds of formula I means halogen, including F, Cl, Br and I.

In an embodiment of the present disclosure the aryl boronic acid of formula I includes those in which $R^2$ to $R^5$ are all H. In a further embodiment of the present disclosure the aryl boronic acid of formula I includes those in which $R^1$ is selected from halo, $CH_3$, $NO_2$ and $CH_2OCH_3$, while $R^2$ to $R^5$ are all H. In another embodiment of the present disclosure the aryl boronic acid of formula I includes those in which $R^1$ is selected from I, Br, Cl and F, while $R^2$ to $R^5$ are all H.

In another embodiment of the present disclosure the aryl boronic acid of formula I includes those in which $R^2$ to $R^5$ are independently selected from H, halo, $CO_2CH_3$, $CO_2CH_2CH_3$, $OCH_3$, $CH_3$, $CO_2H$, $C(O)CH_3$, $S(O)CH_3$, $CF_3$ and $CF_3O$. In another embodiment of the disclosure at least one of $R^2$ to $R^5$ is H. In another embodiment of the present disclosure the aryl boronic acid of formula I includes those in which $R^1$ is selected from halo, $CH_3$, $NO_2$ and $CH_2OCH_3$, $R^2$ to $R^5$ are independently selected from H, halo, $CO_2CH_3$, $CO_2CH_2CH_3$, $OCH_3$, $CH_3$, $CO_2H$, $C(O)CH_3$, $S(O)CH_3$, $CF_3$ and $CF_3O$, and at least one of $R^2$ to $R^5$ is H.

It is a further embodiment of the present disclosure that $R^1$ may be chiral and the method is useful for the activation of carboxylic acids for enantioselective reactions.

It is another embodiment of the present disclosure, the aryl boronic acid of formula I is selected from a compound of formula I(a) to I(w) as shown in Table 1. In a further embodiment, the aryl boronic acid of formula I is selected from 2-bromophenyl boronic acid, 2-iodophenylboronic acid and 2-chlorophenylboronic acid. In another embodiment the aryl boronic acid of formula I is selected from 2-iodo-4,5-dimethoxyphenylboronic acid, 2-iodo-3-methyl-4,5-dimethoxyphenyl boronic acid and 2-iodo-3,5-dimethylphenylboronic acid.

In another embodiment of the present disclosure, the compound of formula I or II is attached to a solid support using known methodologies. Such catalysts are useful, for example, for heterogeneous solid-phase reactions. The solid support may be, for example, but not limited to, silica or a polymeric insoluble matrix such as polystyrene and the boronic acid may be attached, for example, but not limited to, via a chemical bond, for example via an alkoxy or carboxy group.

Compounds of formula I are either commercially available or may be prepared using methods known in the art. For example, the boronic acid group may be attached to a suitable substituted phenyl precursor using transmetallation reaction conditions. In one specific example, a halogen group, such as iodo, may be converted to a Grignard reagent, for example by reaction with phenyl magnesium bromide, and then reacted with a trialkyl borate to produce, under standard reaction conditions, the corresponding the boronic acid.

In embodiments of the present disclosure, the carboxylic acid is electrophilically activated using the compounds of formula I for reaction with a nucleophile in an nucleophilic 1,2-addition reaction with the carbon atom of the $CO_2H$ group, or a conjugate 1,4-addition reaction with the β-carbon atom of an α,β-unsaturated carboxylic acid, or for a Diels-Alder reaction with a diene. The method is also extendable to other cycloadditions of alkenes and alkynes like [3+2] cycloadditions with 4-electron partners other than dienes, including 1,3-dipoles such as, but not limited to, nitrile oxides, azomethine ylids, carbonyl oxides, and the like.

A "Diels-Alder" reaction is an organic chemical reaction (specifically, a cycloaddition) between a conjugated diene and a substituted alkene, commonly termed the dienophile, to form a substituted cyclohexene system.

A nucleophilic "conjugate addition" is an organic reaction involving the reaction of a nucleophile mostly with carbonyl compounds in a 1,2 fashion (addition to the carbon atom of the C=O bond) or, when the carbonyl compound contains an α,β-unsaturated bond, a "conjugate addition" in a 1,4 fashion (addition to the β-carbon atom).

As used herein the expression "under conditions for the electrophilic activation of the carboxylic acid" means in a suitable solvent and a reaction temperature, time and reagent ratio and concentration for the electrophilic activation of the carboxylic acid for subsequent reaction with, for example, a nucleophile or a diene. In an embodiment of the disclosure, the solvent is selected from dichloromethane (DCM), tetrahydrofuran (THF) and toluene. Suitably the solvent is DCM. In a further embodiment of the disclosure, the reaction temperature is room temperature (i.e. about 20° C. to about 27° C.) or slightly above room temperature (i.e. up to about 45° C., suitably up to about 40° C.). In another embodiment of the disclosure, the reaction time is about 2 hours to about 50 hours, suitably about 15 hours to about 48 hours, more suitably about 20 hours.

In a further embodiment of the disclosure, when the reaction is the addition of a nucleophile to the carboxylic acid (via either a 1,2- or 1,4-addition), the ratio of the nucleophile to carboxylic acid is about 1:1 and the concentration of the reagents is about 0.05 M to about 0.1 M, suitably about 0.07 M. In a further embodiment of the disclosure the amount of aryl boronic acid catalyst of formula I is about 1 mol % to about 25 mol %, suitably about 5 mol % to about 25 mol %, more suitably about 10 mol %.

In a further embodiment of the disclosure, when the reaction is a Diels-Alder addition of a diene to a carboxylic acid comprising a double bond, the ratio of the carboxylic acid to the diene is suitably about 1:2.

A person skilled in the art would appreciate that the conditions for the electrophilic activation of the carboxylic acid will vary depending on the structure of the carboxylic acid, the reaction to be performed and the specific catalyst selected, and would be able to vary the reaction conditions within the above ranges to obtain an optimum yield of the desired product. Various methods are available for following the course of a reaction and include, for example, chromatographic and spectroscopy techniques.

Suitably, for nucleophilic addition reactions, the method is performed under anhydrous and inert atmosphere (e.g. under argon or nitrogen) conditions with a means for removal of the water generated in this reaction. Suitably, for Diels-Alder reactions, the method is performed in the presence or absence of water.

A "means for removal of water" as used herein refers to any method or reagent that does not interfere with the reaction of a nucleophile with the carboxylic acid and which provides an effective removal of the water generated in the method of the disclosure. In an embodiment of the disclosure, the means for removal of water are molecular sieves, suitably, 3Å, 4Å and/or 5Å activated molecular sieves (activated by drying in an oven). Other means for removal of water, include, for example, drying agents selected from activated alumina, benzophenone, bentonite clay, calcium chloride, calcium hydride, calcium sulfate, copper(II) sulfate, lithium chloride, lithium bromide, magnesium, magnesium sulfate, potassium carbonate, silica gel, sodium chlorate and sodium sulfate.

In an embodiment of the method of the present disclosure, the nucleophile is any suitable nucleophilic species that one wishes to react with, and form a covalent linkage to, the carbon atom of the $CO_2H$ group, or the β-carbon atom of an α,β-unsaturated carboxylic acid and that works in the method of the disclosure. In an embodiment of the disclosure, the nucleophile is a compound comprising an amine, an alcohol or a thiol. In another embodiment of the disclosure, the nucleophile is a compound comprising a primary or secondary amine. In an embodiment of the disclosure, the amine comprises substituted or unsubstituted aryl groups and/or branched and/or unbranched, saturated and/or unsaturated, substituted or unsubstituted, cyclic and/or acyclic alkyl groups. By aromatic groups it is meant monocyclic or polycyclic aromatic rings having from 6 to 14 carbon atoms and at least one aromatic ring. By alkyl groups it is meant carbon chains or rings having from 1 to 20 carbon atoms. When the alkyl group is unsaturated, it may have from 1 to 5 double and/or triple bonds. Substituents that are optionally on the alkyl and/or aryl groups include, for example, halo, aryl, $C_{1-4}$alkoxy, $C_{1-4}$alkyl, $C(O)C_{1-4}$alkyl, $S(O)C_{1-4}$alkyl, fluoro-substituted $C_{1-4}$alkyl and fluoro-substituted $C_{1-4}$alkoxy. In another embodiment of the disclosure the amine is one of the naturally occurring amino acids or an analog thereof or a protected version thereof.

The carboxylic acid in the method of the present disclosure may be any suitable carboxylic acid-containing compound that one wishes to react with, and form covalent linkages to, for example, a nucleophile or a diene, and that works in the method of the disclosure. In an embodiment of the disclosure the carboxylic acid contains substituted or unsubstituted aryl groups and/or branched and/or unbranched, saturated and/or unsaturated, substituted or unsubstituted, cyclic and/or acyclic alkyl groups. By aromatic groups it is meant monocyclic or polycyclic aromatic rings having from 6 to 14 carbon atoms and at least one aromatic ring. By alkyl groups it is meant carbon chains or rings having from 1 to 20 carbon atoms. When the alkyl group is unsaturated, it may have from 1 to 5 double and/or triple bonds. Substituents that are optionally on the alkyl and/or aryl groups include, for example, halo, aryl, $C_{1-4}$alkoxy, $C(O)C_{1-4}$alkyl, $S(O)C_{1-4}$alkyl, fluoro-substituted C$_{1-4}$alkyl and fluoro-substituted C$_{1-4}$alkoxy. In another embodiment of the disclosure the carboxylic acid is one of the naturally occurring amino acids or an analog thereof or a protected version thereof.

Certain boronic acids possessing particularly good activity in the methods of the present disclosure are new. Accordingly, the present disclosure includes a compound of the formula II:

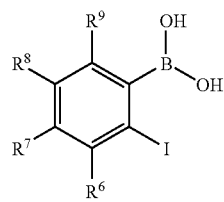

II wherein:
R$^6$ is selected from H and C$_{1-4}$alkyl; and
R$^7$, R$^8$ and R$^9$ are independently selected from H, C$_{1-4}$alkyl and OC$_{1-4}$alkyl and one or two of R$^7$, R$^8$ and R$^9$ is H, or a salt thereof.

In an embodiment of the disclosure R$^6$ is selected from H, methyl and ethyl, R$^7$, R$^8$ and R$^9$ are independently selected from H, methyl, ethyl, methoxy and ethoxy and one or two of R$^7$, R$^8$ and R$^9$ is H, or a salt thereof.

In an embodiment of the present disclosure, the compound of formula II is selected from 2-iodo-4,5-dimethoxyphenyl-boronic acid, 2-iodo-3-methyl-4,5-dimethoxyphenyl boronic acid and 2-iodo-3,5-dimethylphenylboronic acid.

The salt may be any basic addition salt that will form with the compounds of formula II. Salts may be advantageous for isolating and purifying the compounds of formula II. The formation of a desired compound salt is achieved using standard techniques. For example, the neutral compound is treated with a base in a suitable solvent and the formed salt is isolated by filtration, extraction or any other suitable method. The neutral compound may be regenerated by treatment with an acid.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The following non-limiting examples are illustrative of the present disclosure:

EXAMPLES

Example 1

General Amidation Procedure

In a test tube equipped with a stirbar, dried overnight in an oven, was placed (0.5 mmol) of carboxylic acid, 20 mol % of the aryl boronic acid and 1 g of activated 4 Å molecular sieves (also dried overnight in an oven). The cooled test tube was flushed with argon and then 7 ml of the dry solvent (dichloromethane (DCM), tetrahydrofuran (THF) or toluene) was added under argon. The resulting solution or suspension was stirred for 10 minutes and then (0.5 mmol) of amine was added. The reaction was allowed to stir for 48 h at r.t (24-26° C.) then filtered through Celite® 545, and the mixture extracted with water (2×20 ml), brine (30 ml) and dried over anhydrous Na$_2$SO$_4$. Filtration and concentration in vacuo provided the crude product, which was purified by flash column chromatography to give the pure amide. Alternatively, the reaction mixture was filtered through Celite® 545, the filtrate was washed with aqueous acidic solution (pH=4), aqueous basic solution (pH=9), and pre-concentrated with brine. The organic layers were collected, dried over anhydrous Na$_2$SO$_4$ and evaporated to give the pure amide product.

(a) Reaction of Benzylamine with 2-Phenylacetic Acid—Effect of Aryl Boronic Acid Substitution

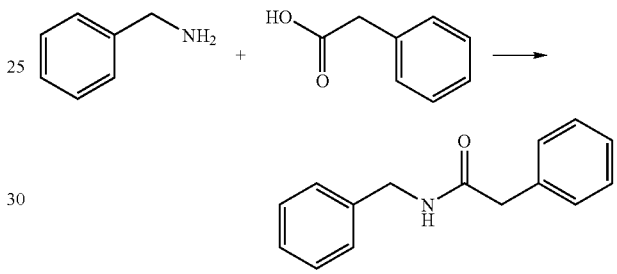

The results for the preparation of N-benzyl-2-phenylacetamide using various aryl boronic acid catalysts according to embodiments of the method of the present disclosure are presented in Table 1.

(b) Reaction of Benzylamine with 2-Phenylacetic Acid—Effect of Aryl Boronic Acid Concentration and mol %.

The reaction described in part (a) was repeated varying the reaction time, concentration of the reagents and mol % of 2-bromophenylboronic acid. The results are shown in Table 2.

(c) Reaction of Benzylamine with 2-Phenylacetic Acid—Effect of Ratio of Reagents The reaction described in part (a) was repeated using 10 mol % 2-bromophenylboronic acid and varying the ratio of the amine and carboxylic acid. The results are shown in Table 3.

(d) Substrate Scope

The general reaction described above was repeated using 10 mol % 2-bromophenylboronic acid and different amines and carboxylic acids. The results are shown in Table 4.

(e) Reaction of Benzylamine with 2-Phenylacetic Acid—Side by Side Comparison of 2-Bromophenylboronic Acid and 2-Iodophenylboronic Acid The general reaction described above was repeated using 10 mol % of either 2-bromophenylboronic acid or 2-iodophenylboronic acid under the identical conditions of room temperature, dichloromethane with activated 4 Å molecular sieves and a reaction time of 6 hours. The yield of amide was 91% with 2-iodophenylboronic acid and 55% with 2-bromophenylboronic acid.

Example 2

General Diels-Alder Procedure

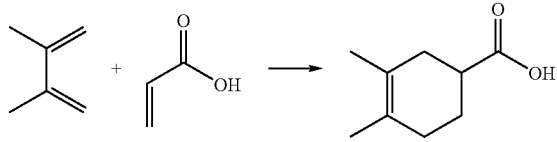

2,3-Dimethylbuta-1,3-diene (2 equiv.) and acrylic acid (1 equiv.) were combined in the presence of 2-bromophenyl boronic acid (0.2 equiv.) and water (0.1 equiv.) in DCM at room temperature for 28 hours. The product, 3,4-dimethyl-cyclohex-3-enecarboxylic acid, was isolated in 76% yield. When the reaction was repeated without the addition of water, the yield was 90%.

This reaction was repeated using various dienes and the results are presented in Table 5.

Example 3

Preparation of 2-iodophenylboronic acid: I(l)

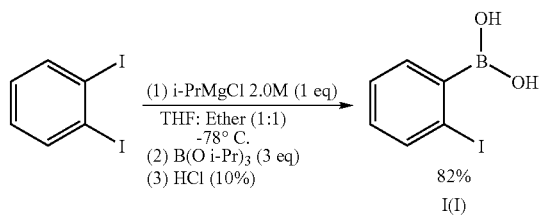

To a solution of 1,2-diiodobenzene (0.102 g, 3.08 mmol) in 60 mL of a mixture of THF and diethylether (Et$_2$O) (1:1) was added dropwise at −78° C. isopropylmagnesium chloride (2 M in THF, 1.54 mL, 3.08 mmol). After the mixture was stirred for 2 h at that temperature, B(O$^i$Pr)$_3$ (1.74 g 2.12 mL, 9.24 mmol) was added. The solution was warmed to room temperature overnight; then 40 mL of HCl (10%) was added, and the resulting mixture was stirred for 30 min at room temperature. The aqueous layer was extracted with Et$_2$O (50 mL, 3 times). Drying over Na$_2$SO$_4$, evaporation and purification by flash chromatography gave 0.62 g of the pure product (82%).

Example 4

Preparation of 2-iodo-3,5-dimethylphenylboronic acid: I(w)

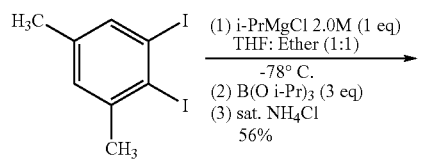

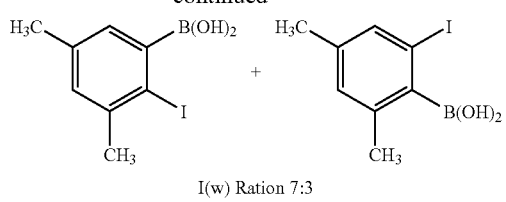

I(w) Ration 7:3

To a solution of 1,2-diiodo-3,5-dimethylbenzene (0.5 g, 1.40 mmol) in 60 mL in a mixture of THF and Et$_2$O (1:1), was added dropwise at −78° C. isopropylmagnesium chloride (2 M in THF, 0.70 mL, 1.40 mmol). After the mixture was stirred for 2 h at −78° C., B(O$^i$Pr)$_3$ (0.96 ml, 4.19 mmol) was added. The solution was warmed to room temperature overnight, then a saturated solution of NH$_4$Cl was added, and the resulting mixture was stirred for 30 min at room temperature. The aqueous layer was extracted with Et$_2$O (50 mL, 3 times), dried over Na$_2$SO$_4$ and concentrated. To the concentrated sample, hexane was added and the resulting precipitate was isolated to provide the products as shown above as non separable mixture.

Spectroscopic Data:

$^1$H-NMR (400 MHz, DMSO) δ 8.15 (s, 2H), 7.06 (d, J=2.4 Hz, 1H), 6.76 (d, J=2.4 Hz, 1H), 2.30 (s, 3H), 2.18 (s, 3H).

$^{13}$C-NMR (125 MHz, DMSO) δ 139.2, 136.2, 130.6, 129.8, 101.4, 28.0, 20.0 (C attached to B not seen on the NMR at 27° C.).

IR (Microscope, cm$^{-1}$) 2951, 1587, 1386, 1342, 1296, 1270, 1000.

HRMS (EI) for C$_8$H$_{10}$$^{11}$BIO$_2$: calcd. 275.98185; found, 275.98239.

X-ray crystallographic structure obtained.

Example 5

Preparation of 2-iodo-3-methyl-4,5-dimethoxyphenylboronic acid: I(x)

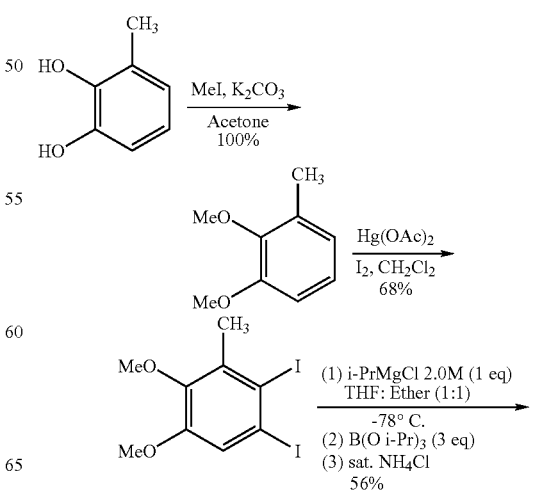

-continued

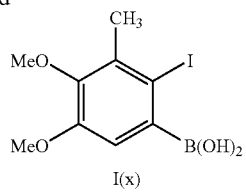

I(x)

(a) 1,2-dimethoxy-3-methylbenzene

In a round bottom flask, 3-methyl catechol (5.0 g, 40.3 mmol), MeI (22.3 g, 157.1 mmol), and $K_2CO_3$ (18.9 g, 136.9 mmol) were dissolved in acetone (20.0 ml). The reaction mixture was stirred at room temperature for 1 h, then at 60° C. for overnight. The reaction mixture was concentrated and chromatographed on silica gel using EtOAc/Hexane (5:95). A pale yellow liquid was isolated in 100% (6.13 g). The characterization of the compound matched previous report: Xing, L.; Wang, X.; Cheng, X.; Zhu, R.; Liu, B.; Hu, Y. Tetrahedron Letters 2007, 63, (38), 9382-9386.

(b) 1,2-diiodo-4,5-dimethoxy-3-methylbenzene

In a round bottom flask, 1,2-dimethoxy-3-methylbenzene (Example 5(a), 2.0 g, 13.15 mmol), $I_2$ (9.02 g, 28.92 mmol), and $Hg(OAc)_2$ (9.22 g, 28.92 mmol) were dissolved in $CH_2Cl_2$ (40.0 ml). The reaction mixture was stirred at room temperature and monitored by TLC. Upon completion, the reaction mixture was filtered and washed with an aqueous solution of sodium thiosulfate, extracted with $CH_2Cl_2$ and washed with brine. The $CH_2Cl_2$ solution was dried with $Na_2SO_4$, concentrated and chromatographed on silica gel using EtOAc/Hexane (10:90). A light orange solid was isolated in 68% (3.61 g).

$^1$H-NMR (300 MHz, $CDCl_3$) δ 7.34 (s, 1H), 3.82 (s, 3H), 3.75 (s, 3H), 2.53 (s, 3H).

$^{13}$C-NMR (100 MHz, DMSO) δ 152.9, 146.4, 137.8, 120.86, 104.4, 102.3, 60.41, 55.99, 25.40.

HRMS (EI) for $C_9H_{10}I_2O_2$: calcd. 403.87702; found, 403.87682

(c) 2-iodo-4,5-dimethoxy-3-methylphenylboronic acid

To a solution of 1,2-diiodo-4,5-dimethoxy-3-methylbenzene (Example 5(b), 2.0 g, 4.95 mmol) in 120 mL of a mixture of THF and $Et_2O$ (1:1) was added dropwise at −78° C., isopropylmagnesium chloride (2 M in THF, 2.72 mL, 5.44 mmol). After the mixture was stirred for 2 h at that temperature, $B(O^iPr)_3$ (10.50 ml, 14.84 mmol) was added. The solution was warmed to room temperature overnight; then a saturated solution of $NH_4Cl$ was added, and the resulting mixture was stirred for 30 min at room temperature. The aqueous layer was extracted with $Et_2O$ (50 mL, 3 times), dried over $Na_2SO_4$ and concentrated. To the concentrated sample, hexane was added and the resulting precipitate was isolated to give 0.90 g of the pure product (56%).

Spectroscopic Data $^1$H-NMR (300 MHz, DMSO) δ 8.14 (s, 2H), 6.73 (s, 1H), 3.76 (s, 3H), 3.64 (s, 3H), 2.27 (s, 3H).

$^{13}$C-NMR (100 MHz, DMSO) δ 152.1, 146.8, 133.9, 114.9, 95.2, 60.2, 55.9, 21.8. (C attached to B not seen on the NMR at 27° C.).

HRMS (EI) for $C_9H_{12}^{11}BIO_4$: calcd. 321.98733; found, 321.98740

X-ray crystallographic structure obtained.

Example 6

Preparation of 2-iodo-4,5-dimethoxyphenylboronic acid: I(v)

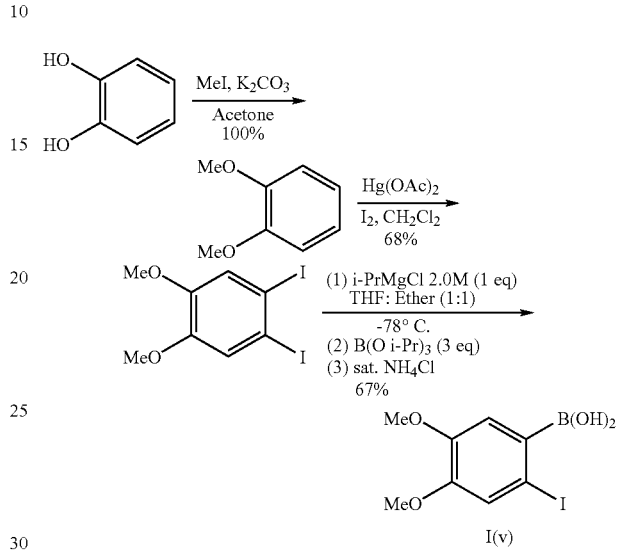

I(v)

(a) 1,2-dimethoxybenzene

In a round bottom flask, catechol (10.0 g, 90.0 mmol), MeI (50.0 g, 354.0 mmol), and $K_2CO_3$ (42.7 g, 309.0 mmol) were dissolved in acetone (40.0 ml). The reaction mixture was stirred at room temperature for 1 h, then at 60° C. for overnight. The reaction mixture was concentrated and chromatographed on silica gel using EtOAc/Hexane (5:95). A colorless liquid was isolated in 100% (12.43 g). The characterization of the compound matched previous report: (a) Paduraru, P. M.; Popoff, R. T. W.; Nair, R.; Gries, R.; Gries, G.; Plettner, E. Journal of Combinatorial Chemistry 2008, 10 (1), 123-134.

(b) 1,2-diiodo-4,5-dimethoxybenzene

In a round bottom flask, 1,2-dimethoxybenzene (Example 6(a), 2.1 g, 15.2 mmol), $I_2$ (10.42 g, 33.44 mmol), and $Hg(OAc)_2$ (10.65 g, 33.44 mmol) were dissolved in $CH_2Cl_2$ (40.0 ml). The reaction mixture was stirred at room temperature and monitored by TLC. Upon completion, the reaction mixture was filtered and washed with an aqueous solution of sodium thiosulfate, extracted with $CH_2Cl_2$ and washed with brine. The $CH_2Cl_2$ solution was dried with $Na_2SO_4$, concentrated and chromatographed on silica gel using EtOAc/Hexane (10:90). A light orange solid was isolated in 67% (4.0 g). The characterization of the compound matched previous report: (a) Pak, J. J.; Mayo, J. L.; Shurdha, E. Tetrahedron Letters 2006, 47, 233-237.

(c) 2-iodo-4,5-dimethoxyphenylboronic acid: I(v)

To a solution of 1,2-diiodo-4,5-dimethoxybenzene (Example 6(b), 2.0 g, 5.13 mmol) in 120 mL of a mixture of THF and $Et_2O$ (1:1) was added dropwise at −78° C. isopropylmagnesium chloride (2 M in THF, 2.67 mL, 5.39 mmol). After the mixture was stirred for 2 h at that temperature, B(O$^i$Pr)$_3$ (10.89 ml, 15.39 mmol) was added. The solution was warmed to room temperature overnight; then a saturated solution of NH$_4$Cl was added, and the resulting mixture was stirred for 30 min at room temperature. The aqueous layer was extracted with Et$_2$O (50 mL, 3 times), dried over Na$_2$SO$_4$ and concentrated. To the concentrated sample, hexane was added and the resulting precipitate was isolated to give 1.05 g of the pure product (67%).

Spectroscopic Data $^1$H-NMR (400 MHz, DMSO) δ 8.14 (s, 2H), 7.17 (s, 1H), 6.80 (s, 1H), 3.69 (s, 3H), 3.68 (s, 3H).

$^{13}$C-NMR (125 MHz, DMSO) δ 149.3, 147.8, 121.0, 116.6, 87.5, 55.4, 55.2 (C attached to B not seen on the NMR at 27° C.).

IR (Microscope, cm$^{-1}$) 2959, 1585, 1506, 1373, 1310, 1263, 1199.

Example 7

Further Amidation Reactions (a) The following additional compounds were prepared using the general amidation procedure described in Example 1 and the corresponding carboxylic acids and amines with either catalyst I(l) or I(m):

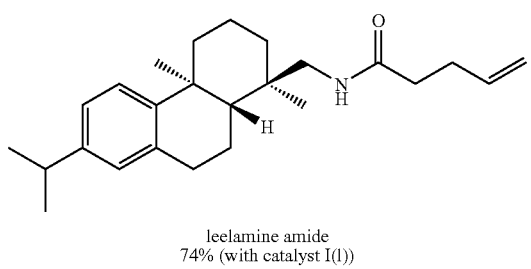

leelamine amide
74% (with catalyst I(l))

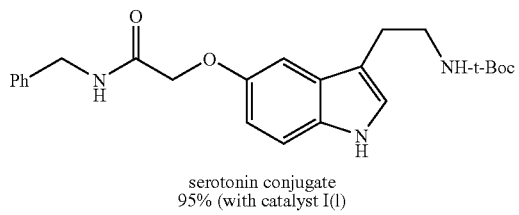

serotonin conjugate
95% (with catalyst I(l))

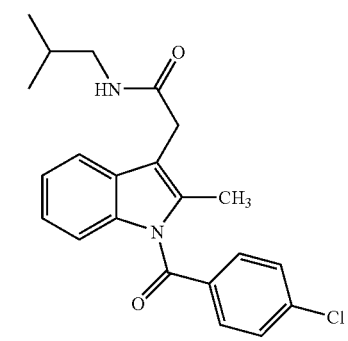

73% (with catalyst I(m))
indomethacin amides
(COX-11 inhibitors: *J. Med. Chem.* 2000, 43, 2860)

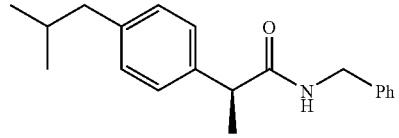

ibuprofen amides
(NSAID with reduced toxicity:
*Pharm. Chem. J.* 2002, 36, 237)
76% (with catalyst I(l))

(b) The following additional reaction was performed using the general amidation procedure described in Example 1 and the catalysts shown below. This result compares the activity of catalyst I(l) with catalyst I(w)

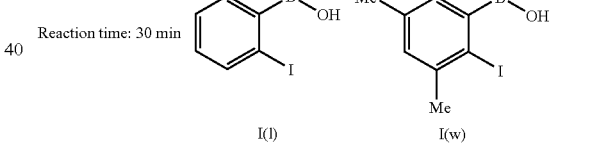

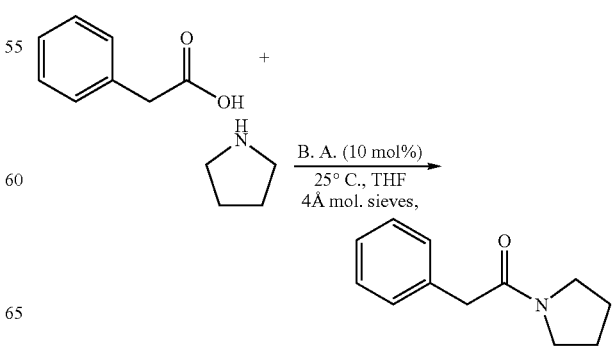

(c) The following additional reaction was performed using the general amidation procedure described in Example 1 and the catalysts shown below. This result compares the activity of catalysts I(l), I(v), I(w) and I(x) using an amine with lower reactivity.

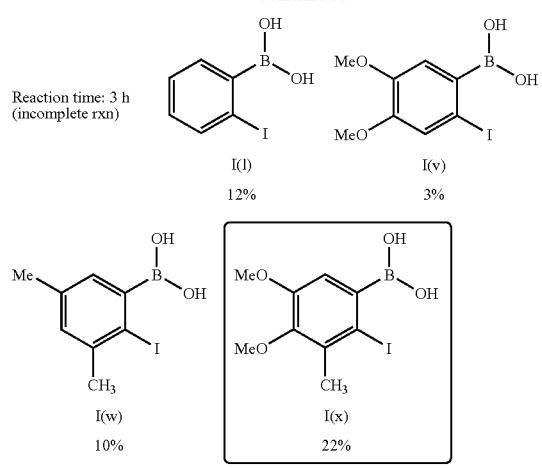

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

| Cpd. No. | $R^1$ | $R^2$ | $R^3$ | $R^4$ | $R^5$ | Solvent | Yield |
|---|---|---|---|---|---|---|---|
| N/A | H | H | H | H | H | DCM | 31%[1] |
| I(a) | CH$_2$OCH$_3$ | H | H | H | H | DCM | 100% |
| I(b) | F | H | F | H | H | DCM | 73% |
| I(c) | F | H | H | H | F | DCM | 76% |
| I(d) | CH$_3$ | H | H | H | H | DCM | 83% |
| I(e) | CH$_3$ | H | H | H | CH$_3$ | DCM | 87% |
| I(f) | NO$_2$ | H | H | H | H | DCM | 95% |
| I(g) | CN | H | H | H | H | DCM | 86%[2] |
| I(h) | S(O)CH$_3$ | H | H | H | H | DCM | 100%[2] |
| I(i) | Br | H | H | H | H | DCM | 100% |
| I(j) | Cl | H | H | H | H | DCM | 100% |
| I(k) | F | H | H | H | H | DCM | 98% |
| I(l) | I | H | H | H | H | DCM | 100% |
| I(m) | Br | H | H | H | F | DCM | 33% |
| I(n) | Br | H | H | CF$_3$ | H | DCM | 60% |
| I(o) | Br | H | H | CF$_3$ | H | THF | 69% |
| I(p) | NO$_2$ | H | C(O)CH$_3$ | H | H | DCM | 53% |
| I(q) | I | H | H | H | F | DCM | 50% |
| I(r) | Cl | H | CO$_2$H | H | H | DCM | 49% |
| I(s) | Cl | H | CO$_2$Et | H | H | DCM | 77% |
| I(t) | Br | H | F | F | H | DCM | 64% |
| I(u) | Cl | H | OEt | H | H | DCM | 79% |

[1]Comparative example.
[2]Reaction temperature = 35–40° C.

TABLE 2

| Catalyst mol % | Time (hours) | Concentration (mol) | DCM | THF | Toluene |
|---|---|---|---|---|---|
| 20 | 48 | 0.07 | 98 | 80 | 73 |
| 10 | 48 | 0.07 | 95 | 48 | 39 |
| 5 | 48 | 0.07 | 64 | 31 | 30 |
| 5 | 78 | 0.07 | 82 | 78 | 35 |
| 5 | 48 | 0.25 | 45 | 48 | 15 |
| 5 | 48 | 0.50 | 21 | 12 | 15 |
| 10 | 17 | 0.07 | 91 | | |

TABLE 3

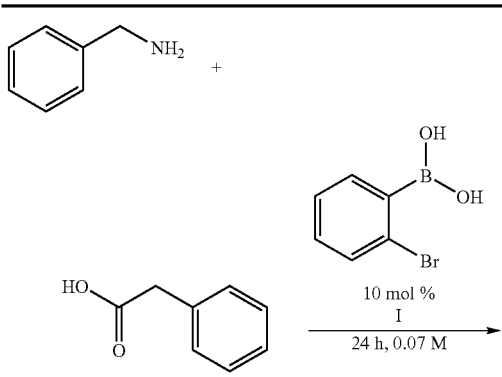

TABLE 3-continued

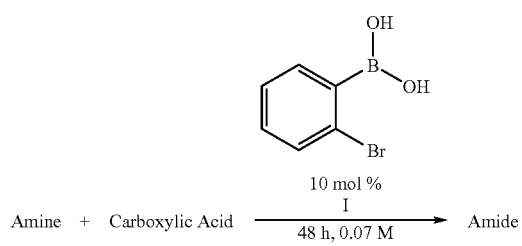

N-benzyl-2-phenylacetamide

| # Eq. Amine | # Eq. Acid | Yield |
|---|---|---|
| 1 | 1 | 50% |
| 1.1 | 1 | 21% |
| 1 | 1.1 | 49% |
| 1 | 1.4 | 50% |

TABLE 4

Amine + Carboxylic Acid $\xrightarrow[\text{48 h, 0.07 M}]{\text{10 mol % I}}$ Amide (with 2-bromophenylboronic acid catalyst)

| Amine | Carboxylic Acid | Product | Yield |
|---|---|---|---|
| benzylamine | phenylacetic acid | N-benzyl-2-phenylacetamide | 100% |
| n-butylamine | phenylacetic acid | N-butyl-2-phenylacetamide | 66% |
| n-pentylamine | phenylacetic acid | N-pentyl-2-phenylacetamide | 80% |
| isobutylamine | phenylacetic acid | N-isobutyl-2-phenylacetamide | 66% |
| N-methylbenzylamine | phenylacetic acid | N-benzyl-N-methyl-2-phenylacetamide | 0% |

TABLE 4-continued

Amine + Carboxylic Acid →(2-bromophenylboronic acid, 10 mol % I, 48 h, 0.07 M)→ Amide

| Amine | Carboxylic Acid | Product | Yield |
|---|---|---|---|
| 3-phenylpropylamine | phenylacetic acid | N-(3-phenylpropyl)-2-phenylacetamide | 61%[1] |
| N,N-diethylethylenediamine | phenylacetic acid | N-(2-(diethylamino)ethyl)-2-phenylacetamide | 0% |
| dibutylamine | phenylacetic acid | N,N-dibutyl-2-phenylacetamide | 0% |
| benzylamine | heptanoic acid | N-benzylheptanamide | 100% |
| benzylamine | 4-pentenoic acid | N-benzyl-4-pentenamide | 72% |
| benzylamine | acrylic acid | N-benzylacrylamide | 0% |

[1] 35-40° C.

TABLE 5

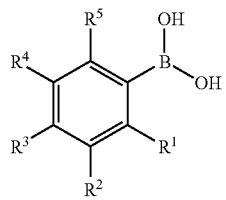

| Diene | Product | Yield |
|---|---|---|
| | | 90% |
| | | 4% + 91% |
| | | |
| | | 99% (after 24 h) |
| | | 30% (NMR yield) |

We claim:

1. A compound of the formula II:

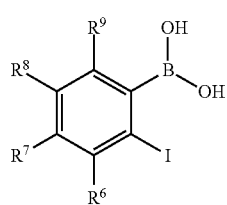

wherein:
$R^6$ is selected from H and $C_{1-4}$alkyl; and
$R^7$, $R^8$ and $R^9$ are independently selected from H, $C_{1-4}$alkyl and $OC_{1-4}$alkyl and one or two of $R^7$, $R^8$ and $R^9$ is H.

2. The compound of claim 1, wherein $R^6$ is selected from H, methyl and ethyl, $R^7$, $R^8$ and $R^9$ are independently selected from H, methyl, ethyl, methoxy or ethoxy and one or two of $R^7$, $R^8$ and $R^9$ is H.

3. The compound of claim 1 selected from 2-iodo-4,5-dimethoxyphenylboronic acid, 2-iodo-3-methyl-4,5-dimethoxyphenyl boronic acid and 2-iodo-3,5-dimethylphenylboronic acid.

4. A method for the catalytic electrophilic activation of carboxylic acids comprising combining the carboxylic acid and an aryl boronic acid of the formula II:

I wherein
$R^6$ is selected from H and $C_{1-4}$alkyl; and
$R^7$, $R^8$ and $R^9$ are independently selected from H, $C_{1-4}$alkyl, $OC_{1-4}$alkyl and one or two of $R^7$, $R^8$ and $R^9$ is H,
under conditions for the electrophilic activation of the carboxylic acid.

5. The method according to claim 4, wherein, in the aryl boronic acid of formula II, $R^7$, $R^8$ and $R^9$ are independently selected from H, methyl, ethyl, methoxy and ethoxy.

6. The method according to claim 4, wherein the aryl boronic acid of formula II is selected from 2-iodo-4,5-dimethoxyphenylboronic acid, 2-iodo-3-methyl-4,5-dimethoxyphenyl boronic acid and 2-iodo-3,5-dimethylphenylboronic acid.

7. The method according to claim 4, wherein the conditions for the electrophilic activation of the carboxylic acid comprise a suitable solvent and a reaction temperature, time and reagent ratio and concentration for the activation of the carboxylic acid.

8. The method according to claim 7, wherein the solvent is selected from dichloromethane (DCM), tetrahydrofuran (THF) and toluene.

9. The method according to claim 8, wherein the solvent is DCM.

10. The method according to claim 7, wherein the reaction temperature is about 20° C. to about 27° C.

11. The method according to claim 7, wherein the reaction temperature is about 20° C. to about 45° C.

12. The method according to claim 7, wherein the reaction time is about 2 hours to about 50 hours.

13. The method according to claim 7, wherein the amount of aryl boronic acid catalyst of formula II is about 1 mol % to about 25 mol %.

14. The method according to claim 1, wherein the carboxylic acid is electrophilically activated for reaction with a nucleophile in a nucleophilic 1,2-addition reaction with the carbon atom of the $CO_2H$ group, or a conjugate 1,4-addition reaction with the β-carbon atom of an α,β-unsaturated carboxylic acid, or for a cycloaddition reaction.

15. The method according to claim 14, wherein the carboxylic acid is electrophilically activated for reaction with a nucleophile in a nucleophilic 1,2-addition reaction with the carbon atom of the $CO_2H$ group and the reaction is performed in the presence of a means for removal of water.

16. The method according to claim 15, wherein the method is performed under anhydrous and inert atmosphere conditions.

17. The method according to claim 15, wherein the ratio of carboxylic acid to nucleophile is 1:1.

18. The method according to claim 14, wherein the nucleophile is a compound comprising an amine, an alcohol or a thiol.

19. The method according to claim 14, wherein the cycloaddition reaction is a Diels-Alder reaction with a diene.

20. The method according to claim 19, wherein the ratio of carboxylic acid to diene is 1:2.

* * * * *

UNITED STATES PATENT AND TRADEMARK OFFICE
CERTIFICATE OF CORRECTION

PATENT NO. : 8,822,720 B2  
APPLICATION NO. : 12/669983  
DATED : September 2, 2014  
INVENTOR(S) : Dennis Hall, Olivier Marion and Raed Al-Zoubi Page 1 of 1

It is certified that error appears in the above-identified patent and that said Letters Patent is hereby corrected as shown below:

In the Claims

Claim 4, Column 22, lines 5-15, replace " 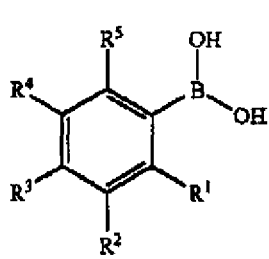 "

with -- 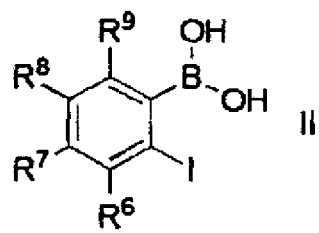 --.

Claim 14, Column 22, line 51, replace "The method according to claim 1" with --The method according to claim 4--.

Signed and Sealed this  
Third Day of March, 2015

Michelle K. Lee  
*Deputy Director of the United States Patent and Trademark Office*